June 7, 1960   E. H. E. ERTEL ET AL   2,939,238
FISHING APPARATUS
Filed Oct. 1, 1957
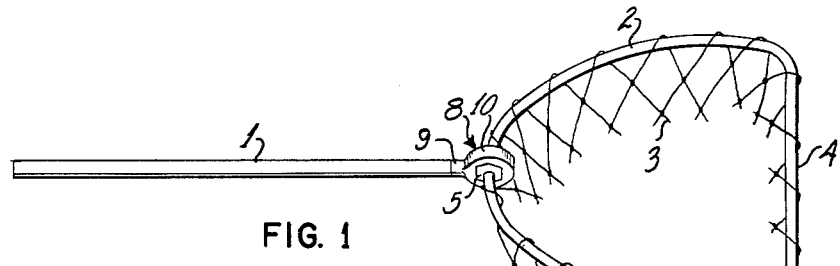
FIG. 1
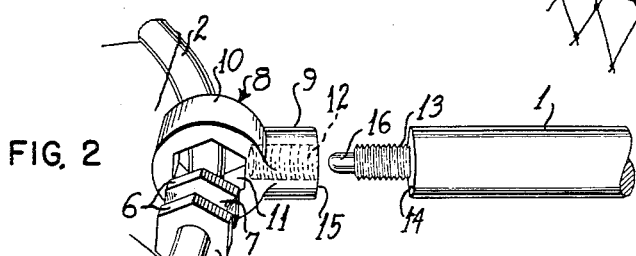
FIG. 2
FIG. 3
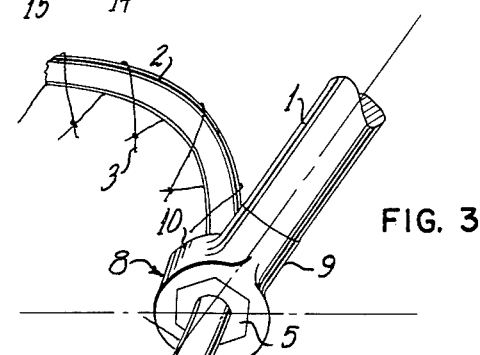
FIG. 5
FIG. 4
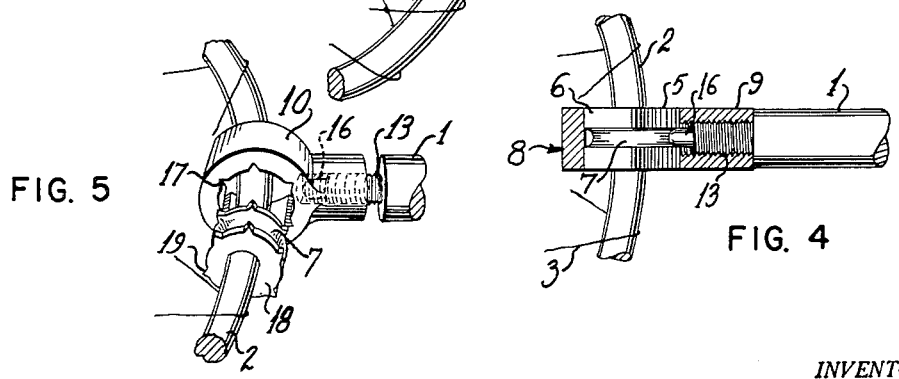
INVENTOR.
EDWIN H. E. ERTEL
HERBERT A. GUTKNECHT
BY
Andrus, Sceales & Starke
ATTORNEYS

United States Patent Office 2,939,238
Patented June 7, 1960

2,939,238

FISHING APPARATUS

Edwin H. E. Ertel and Herbert A. Gutknecht, Milwaukee, Wis., assignors to Gutert Quality Products, Inc., Milwaukee, Wis., a corporation of Wisconsin Filed Oct. 1, 1957, Ser. No. 687,557

9 Claims. (Cl. 43—11)

This invention relates to fishing apparatus and more particularly to a fishing net of the general type having a handle and a frame on one end of the handle to which a net is secured.

When a fishing net of the above general type is utilized for catching minnows or any other fish, it is sometimes desirable to place the net in at least a partially horizontal position so that fish swimming over the net can be caught by raising the net upwardly. It is also sometimes desirable to dispose the net substantially vertically so that it may be swept horizontally to catch the fish.

Conventional fish nets are usually made so that the latter method may easily be accomplished, the handle and net frame being in a single plane so that the net attains the desired vertical position when the handle is inserted vertically into the water. However, if the same net is utilized with the first method, the operator often has great difficulty, especially if the water is very deep. The handle will necessarily have to approach a horizontal plane, and may have to be totally submerged to obtain the proper net frame angle.

The present invention overcomes the difficulty presented above, and provides a fishing net construction which is adjustable to provide a plurality of net angles relative to the handle. The angle is maintained by a positive locking mechanism, which does not depend on frictional engagement and which also prevents any lateral shifting of the net frame relative to the handle.

The accompanying drawings illustrate the best mode presently contemplated by the inventors for carrying out the invention.

In the drawings:

Figure 1 is a perspective view of a fish net constructed in accordance with the invention;

Fig. 2 is an enlarged detail perspective exploded view of the handle-net frame joint of Figure 1 and showing the positive locking mechanism released;

Fig. 3 is an enlarged detail perspective view of the locked joint, showing the net frame at an angle to the handle;

Fig. 4 is a top plan view of the locked joint of Figure 1, with parts in section; and Fig. 5 is an enlarged detail perspective exploded view of another embodiment of the invention.

As shown in Figs. 1–4 of the drawings, the invention is embodied in a fishing apparatus having a long handle 1 and a net frame 2 connected to one end thereof. A suitable net 3 is secured to frame 2, and is of the desired type for catching or scooping fish.

The net frame may be of any desired shape, and is shown as semi-circular with a flat portion 4 farthest from the handle. A collar 5 is secured as by welding to frame 2 adjacent handle 1, and is provided with a plurality of flat surfaces 6 on the circumference thereof. Surfaces 6 provide an irregular circumferential configuration and adjacent surfaces are mutually joined at an angular edge to provide a hexagonal shaped collar. The number of surfaces 6 may be varied, if desired.

An annular circumferential notch or groove 7 is provided in collar 5, and is shown as being approximately midway between the end faces of the latter, thereby doubling the normal number of faces 6. Groove 7 provides a smooth surface which is depressed below surfaces 6 for purposes to be described.

The main shank portion of handle 1 may be of any conventional form such as tubular, solid, telescoping and the like. The end of handle 1 to be disposed closest to frame 2 is adapted for connection thereto by a coupling member, indicated generally at 8. Member 8 comprises a cylindrical inner shank portion 9 which merges outwardly into a ring-like connector portion 10. The inner surface of the opening in connector 10 is provided with a series of flat surfaces 11 which are mutually joined and which correspond in irregular configuration with surfaces 6.

Bore 12 in member 8 is adapted to threadably receive a threaded extension 13 of handle 1, said extension being shown as reduced in diameter relative to the diameter of the handle. Handle 1 is secured to coupling 8 by threading extension 13 into bore 12 until the lateral face 14 of the handle engages the lateral face 15 of the coupling.

As clearly shown in Figs. 1 and 4, collar 5 is adapted to fit within the opening in coupling 8 so that surfaces 6 and 11 are in face-to-face mating engagement, thus preventing any rotation of net frame 2 about the axis of the connector opening, said axis also being transverse to the handle. Collar 5 and coupling 8 thus provide interlocking coupling means on the frame and handle adapted to provide for pivotal adjustment of the frame relative to the handle on an axis transverse to the handle and for locking of the frame and handle against relative pivotal movement at any selected position of adjustment.

Lateral shifting of frame 2 relative to coupling 8 and handle 1 is prevented by a rounded nubbin 16 disposed on the end of extension 13 and which enters and engages the surface of groove 7 when handle 1 is threadably tightened. Groove 7 and nubbin 16 thus provide releasable means associated with the interlocking coupling means to prevent disassembly thereof when assembled and locked in coupling position.

The interlocking coupling means provides for disassembly of the interlocking parts thereof by relative lateral movement between the frame and handle in the direction of the pivotal axis transverse to the handle. This is accomplished with the structure illustrated in the drawings as follows: Assume that the fish net is in its normal position, shown in Figure 1, with frame 2 in a plane parallel to the handle axis. If it is desired to change the angle of the net relative to the handle, the latter is unscrewed from coupling 8 for a distance at least sufficient to release nubbin 16 from groove 7. Frame 2 is then moved laterally until collar 5 is released from connector 10, and the frame is subsequently rotated about the connector axis and the collar again inserted therein. In this new position, one of which is shown in Fig. 3, surfaces 6 mate with different surfaces 11 and rotation about the connector axis is lockingly prevented by the lateral meeting edges of the surfaces. Handle 1 is again tightened so that nubbin 16 enters groove 7 and positively locks lateral shifting of the net.

Fig. 5 shows a second embodiment of the invention wherein the opening in connector 10 is substantially circular and is provided with a plurality of circumferentially spaced lateral grooves or slots 17. A circular collar 18, corresponding to collar 5, is secured to frame 2 and has a series of circumferentially spaced lateral tooth-like ribs 19 which are adapted to selectively enter slots 17.

If desired, frame 2 may be swung 180° from its normal position so that flat portion 4 rests against the handle. The net may be locked against any movement, as described above. This position, not shown, would be highly suitable for storage of the apparatus.

The net may be adjusted throughout an arc closely approaching 360°, limited only by the handle diameter. The number of angular positions available within the 360° is determined by the number of mating surfaces 6 and 11 (or slots 17 and ribs 19) provided on the connecting apparatus.

The invention provides a positve selective locking connection between a handle and fish net which does not depend on frictional engagement and resistance to maintain the lock. The fish net of the present invention is believed economical to manufacture, as well as simple to assemble, disassemble and adjust.

Various modes of carrying out the invention are contemplated as being within the scope of the following claims particularly pointing out and distinctly claiming the subject matter which is regarded as the invention.

We claim:

1. Fishing apparatus comprising, a handle; a frame adapted to receive a net or the like; and means joining said handle and frame whereby said frame may be selectively locked in a plurality of angular positions relative to said handle and whereby adjustment of said handle locks said frame to said handle to prevent relative lateral movement therebetween; said means comprising an annular collar secured to said frame with the circumferential outer surface portion of said collar having a generally non-circular configuration and having an annular groove therein, a coupling disposed to engage said collar and having an opening therein defining a surface of non-circular configuration adapted to receive said collar surface in a plurality of positively locked relative angular positions, said coupling having a bore therein communicating with said first opening to removably receive one end of said handle, and a member extending from the end of said handle and engageable with said groove when said handle end is received by said bore whereby said collar is positively locked from moving laterally of said coupling.

2. In a fishing apparatus having a handle and a frame adapted to receive a net or the like, means to adjustably join said handle and frame, comprising, a collar secured to said frame, a coupling disposed to engage said collar in a plurality of positively locked relative angular positions, said coupling having a bore for therein threadably receiving one end of said handle, and means extending from said handle end and releasably engageable with said collar whereby the latter is positively locked from moving laterally of said coupling when said handle end is threadably received by the bore in said coupling.

3. The apparatus of claim 2 wherein the outer circumferential surface of said collar has non-circular configuration, and wherein said coupling has an axial opening therein defining a surface of non-circular configuration adapted to receive said collar surface in mating engagement therewith.

4. The apparatus of claim 3 in which the collar surface comprising a plurality of flat surfaces and with adjacent surfaces joined at an angular edge, and in which the coupling surface defined by the axial opening corresponds in configuration to the collar surface.

5. The apparatus of claim 3 in which the collar surface and the coupling surface defined by the axial opening are substantially circular, lateral rib means disposed on one of said surfaces, and lateral groove means disposed in the other of said surfaces and adapted to receive said rib means.

6. In a fishing apparatus having a handle and a frame adapted to receive a net or the like, means to adjustably join said handle and frame, comprising, an annular collar secured to said frame and with the outer surface of said collar having a circumferential groove therein, a coupling disposed to engage said collar in a plurality of positively locked relative angular positions, said coupling having a bore therein for threadably receiving one end of said handle and with said bore extending to adjacent said groove when the collar and coupling are assembled, and means disposed on the end of said handle and engageable with said groove when said handle end is received within the bore of said coupling whereby said collar is positively locked from moving laterally of said coupling.

7. The apparatus of claim 6 wherein the outer circumferential surface of said collar has a non-circular configuration, and wherein said coupling has an axial opening therein communicating with said bore and defining a surface of non-circular configuration adapted to receive said collar surface in mating engagement therewith.

8. The apparatus of claim 7 in which the collar surface comprises a plurality of flat surfaces and with adjacent surfaces joined at an angular edge, and in which the coupling surface defined by the axial opening corresponds in configuration to the collar surface.

9. The apparatus of claim 7 in which the collar surface and the coupling surface defined by the axial opening are substantially circular, lateral rib means disposed on one of said surfaces, and lateral groove means disposed in the other of said surfaces and adapted to receive said rib means.

References Cited in the file of this patent

UNITED STATES PATENTS

| | | |
|---|---|---|
| 737,428 | Lindsey et al. | Aug. 25, 1903 |
| 820,292 | Dunbar | May 8, 1906 |
| 956,803 | Fromm | May 3, 1910 |
| 2,659,258 | Dillard | Nov. 17, 1953 |

FOREIGN PATENTS

| | | |
|---|---|---|
| 280,748 | Great Britain | Nov. 24, 1927 |
| 420,378 | France | Nov. 22, 1910 |
| 674,712 | France | Oct. 22, 1929 |